US012188651B1

(12) United States Patent
Deng et al.

(10) Patent No.: US 12,188,651 B1
(45) Date of Patent: Jan. 7, 2025

(54) OPEN EAR CLIP HEADPHONE

(71) Applicant: Shenzhen Elenose Technology Co. LTD., Shenzhen (CN)

(72) Inventors: Jiaxiong Deng, Guangdong (CN); Zhedong He, Guangdong (CN)

(73) Assignee: Shenzhen Elenose Technology Co. LTD., Shenzhen (CN)

( * ) Notice: Subject to any disclaimer, the term of this patent is extended or adjusted under 35 U.S.C. 154(b) by 0 days.

(21) Appl. No.: 18/885,570

(22) Filed: Sep. 14, 2024

(30) Foreign Application Priority Data

Mar. 19, 2024 (CN) ......................... 202420537774.7

(51) Int. Cl.
*H04R 1/10* (2006.01)
*F21V 33/00* (2006.01)

(52) U.S. Cl.
CPC ....... *F21V 33/0056* (2013.01); *H04R 1/1008* (2013.01); *H04R 1/1041* (2013.01); *H04R 1/105* (2013.01); *H04R 1/1075* (2013.01)

(58) Field of Classification Search
CPC ..... F21V 33/0056; H04R 1/008; H04R 1/041; H04R 1/105; H04R 1/1075
See application file for complete search history.

(56) References Cited

U.S. PATENT DOCUMENTS

2013/0114825 A1* 5/2013 Andreasen ........... H04R 5/0335 381/74
2017/0195770 A1* 7/2017 Cheney ................ H04R 1/1016

* cited by examiner

*Primary Examiner* — Simon King

(57) ABSTRACT

An open ear clip headphone having an output part and a wearing part is disclosed. The output part is provided with a control circuit board, and the wearing part comprises an elastic sleeve connected to the output part. The elastic sleeve comprises a first pipe hole, and the pipe wall has an axial transparent part. A light strip comprising a flexible circuit, a plurality of luminous bodies, and a wrapping body is inserted into the first pipe hole of the elastic sleeve with the luminous bodies facing the transparent part, or the light strip and the elastic sleeve are injection molded together with the luminous bodies facing the transparent part. The control circuit board has a luminous driving circuit, and the flexible circuit is electrically connected to the luminous driving circuit. It expands the luminous area of the open ear clip headphones.

15 Claims, 5 Drawing Sheets

OPEN EAR CLIP HEADPHONE

CROSS REFERENCE OF RELATED APPLICATION

The present invention claims priority under 35 U.S.C. 119 (a-d) to CN 202420537774.7, filed Mar. 19, 2024.

BACKGROUND OF THE PRESENT INVENTION

1. Field of Invention

The present invention belongs to an applied technology field of consumer electronic luminescent devices.

2. Description of Related Arts

Headphones are devices for converting audio signals to sound. Headphones can convert audio signals from computers, mobile phones, media players, etc. into audible sound waves. Due to the personalized auditory experience provided by headphones, users can enjoy audio content without disturbing others, while isolating some external noise. They are particularly suitable for various occasions such as high fidelity music appreciation, professional recording monitoring, game sound effects experience, call confidentiality, listening in travel or noisy environments.

Wireless headphones are the application of wireless transmission technology to hands-free earphones. Wireless headphones allow users to easily communicate in various ways without being bound by electronic devices. With the continuous development and application of wireless headphones, luminescent headphones have also emerged, which can enhance the user experience and also serve as a warning, thereby improving the safety of user use. But for existing luminescent headphones, their luminous area is relatively small.

SUMMARY OF THE PRESENT INVENTION

An objective of the present disclosure is to provide an open ear clip headphone, in order to increase the area of the luminous region.

To solve the above technical problems, an open ear clip headphone is provided according to an aspect of the present disclosure. The open ear clip headphone comprising: an output part and a wearing part, wherein:

- the output part comprises a control circuit board, and the control circuit board has a luminous driving circuit,
- the wearing part is in the shape of an arc adapted to the human ear and the wearing part comprises:
- an elastic sleeve connected to the output part, wherein the elastic sleeve comprises a first pipe hole along the axial direction of the elastic sleeve, and the wall of the first pipe hole has an axially arranged transparent part;
- a light strip comprising a flexible circuit in the form of a strip, a plurality of luminous bodies respectively arranged on the same surface of the flexible circuit, and a wrapping body that wraps or partially wraps the flexible circuit and luminous bodies, wherein the plurality of luminous bodies are arranged along the direction of the length of the flexible circuit, and the part corresponding to the luminous bodies on the wrapping body is transparent or semi transparent; the light strip is inserted into the first pipe hole of the elastic sleeve with the luminous bodies emitting light through the transparent part; the flexible circuit is electrically connected to the luminous driving circuit.

Advantageously, the output part comprises a main housing and a device emitting sound through a diaphragm, the device emitting sound through a diaphragm electrically connects to the control circuit board, the device emitting sound through a diaphragm and the control circuit board are respectively set inside the main housing, and the main housing has directional sound pipe holes;

the length of the transparent part on the elastic sleeve exceeds half of the length of the wearing part in the direction of the length of the wearing part, the transparent part is located on the opposite direction side as the directional sound pipe holes, or the transparent part is located on the same side as the directional sound pipe holes, or the transparent part is located on the outer edge of the elastic sleeve.

Advantageously, the elastic sleeve is composed of a first pipe wall and a second pipe wall respectively arranged along the axial direction of the elastic sleeve, the first pipe hole is surrounded by the first pipe wall and the second pipe wall, the transparency of the first pipe wall is greater than that of the second pipe wall, and the transparent part is composed by the first pipe wall.

Advantageously, the wearing part comprises an elastic metal wire, and the elastic metal wire is inserted into the first pipe hole of the elastic sleeve against the transparent part.

Advantageously, the open ear clip headphone comprises a battery part, and the wearing part is connected between the output part and the battery part, the control circuit board inside the output part is electrically connected to the battery in the battery part through cables passing through the wearing part, and the elastic sleeve is located between the output part and the battery part.

Advantageously, the wearing part is in a hook shape that matches the shape of the base of the auricle, when the open ear clip headphone wearing on the ear, the output part is located on the front side of the auricle, the wearing part wraps from the front side of the auricle through the top of the auricle to the back side of the auricle, and the battery part is located on the back side of the auricle.

Advantageously, the wearing part is arc-shaped, when the open ear clip headphone wearing on the ear, the output part is inserted into the ear nail cavity, the wearing part is wrapped from the front side of the auricle to the back side of the auricle through the side of the auricle, and the battery part is located on the back side of the auricle.

Advantageously, the elastic sleeve comprises a first part and a second part arranged along the direction of the length of the elastic sleeve, the transparency of the first part is greater than that of the second part, the first pipe hole is located in the first part, the second part has a second pipe hole along the direction of the length of the elastic sleeve, and the cables are threaded through the second pipe hole.

Advantageously, the wearing part comprises an elastic metal wire, the second part has a third pipe hole arranged along the direction of the length of the elastic sleeve, and the elastic metal wire is threaded through the third pipe hole.

Advantageously, the wearing part comprises an elastic metal wire, the light strip, the clastic metal wire and the cables are threaded through the first pipe hole together.

Advantageously, the wrapping body of the light strip is composed of elastic material, the light strip is tightly fitted with the pipe wall of the first pipe hole through the wrapping body, the outer diameter of the wrapping body at different positions in the length direction is same;

- the flexible circuit comprises a flexible substrate and a printed circuit set on the flexible substrate, and the plurality of luminescent bodies are electrically connected to the printed circuit, the part of the wrapping body located on one side of the luminous bodies is composed of transparent or semi transparent material.

Advantageously, the clastic sleeve comprises a first part and a second part arranged along the direction of the length of the elastic sleeve, and the transparency of the first part is greater than that of the second part, the first pipe hole is located in the first part;

the wearing part comprises an elastic metal wire, and the second part comprises a third pipe hole arranged along the direction of the length of the elastic sleeve, and the elastic metal wire is threaded through the third pipe hole.

Advantageously, the wearing part is in a hook shape that matches the shape of the base of the auricle, when the open ear clip headphone wearing on the ear, the output part is located on the front side of the auricle, and the wearing part wraps from the front side of the auricle through the top of the auricle to the back side of the auricle.

Advantageously, the wearing part is arc-shaped, when the open ear clip headphone wearing on the ear, the output part is inserted into the ear nail cavity, and the wearing part is wrapped from the front side of the auricle to the back side of the auricle through the side of the auricle.

According to another aspect of the present disclosure, an open ear clip headphone comprising an output part and a wearing part is disclosed, wherein:

the output part comprises a control circuit board, and the control circuit board has a luminous driving circuit, the wearing part is in the shape of an arc adapted to the human ear and the wearing part comprises:

an elastic sleeve connected to the output part, wherein the elastic sleeve comprises a first pipe hole along the axial direction of the elastic sleeve, and the wall of the first pipe hole has an axially arranged transparent part;

a light strip comprising a flexible circuit in the form of a strip, a plurality of luminous bodies respectively arranged on the same surface of the flexible circuit, and a wrapping body that wraps or partially wraps the flexible circuit and luminous bodies, wherein the plurality of luminous bodies are arranged along the direction of the length of the flexible circuit, and the part corresponding to the luminous bodies on the wrapping body is transparent or semi transparent; the light strip is injection molded with the elastic sleeve with the luminous bodies emitting light through the transparent part; the flexible circuit is electrically connected to the luminous driving circuit.

The open ear clip headphone disclosed in the present disclosure has following beneficial effect. It expands the luminous area of the open ear clip headphone by inserting a light strip into an elastic sleeve with a transparent part to form the wearing part of the open ear clip headphone, wherein the light strip is constituted by wrapping a flexible circuit integrated with the luminous body in the wrapping body.

DETAILED DESCRIPTION OF THE PREFERRED EMBODIMENT

To make the object, the technical solution, and the advantage of the present disclosure more clearly, the present disclosure is further described in detail below with reference to the accompanying embodiments. It should be understood that the specific embodiments described herein are just a part of rather than all the embodiments of the present disclosure. All other embodiments obtained by one skilled in the art without inventive works based on the embodiment of the present disclosure, fall into the protection scope of the present disclosure.

Figure 1:
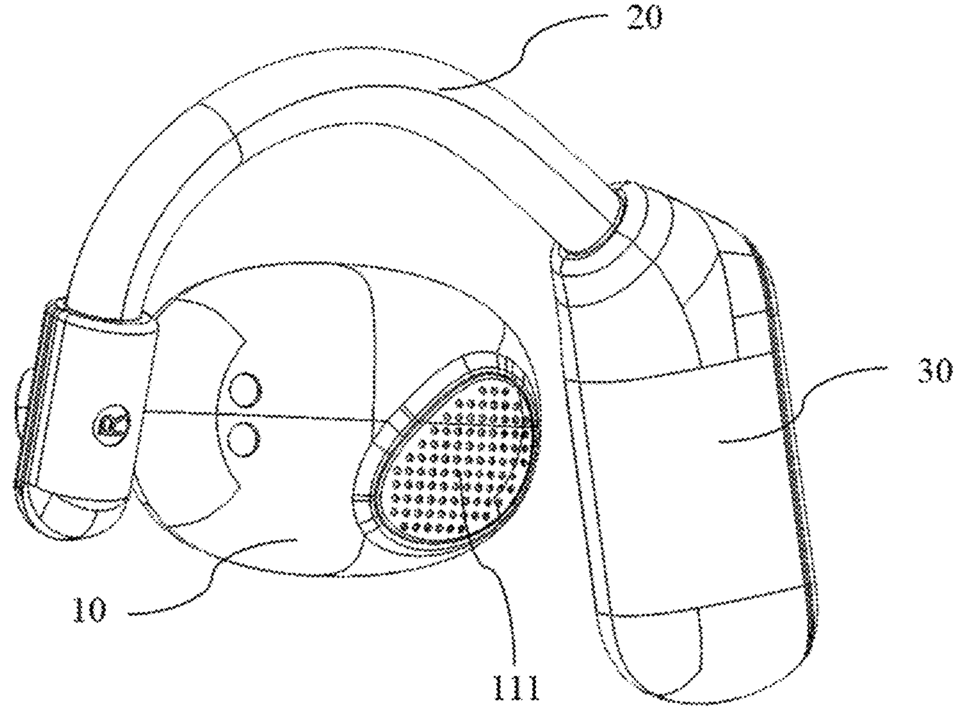
FIG. 1 is a schematic diagram of the open ear clip headphone according to an embodiment of the present disclosure.
Figure 2:
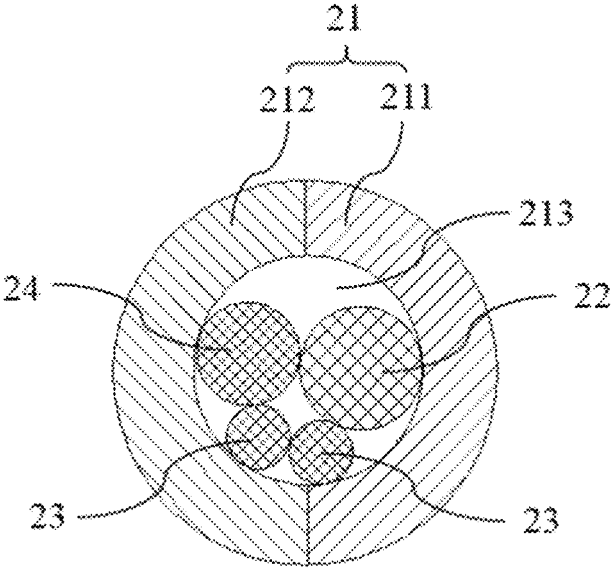
FIG. 2 is a schematic diagram of the cross-sectional structure of the wearing part of the open ear clip headphone according to an embodiment of the present disclosure.
Figure 3:
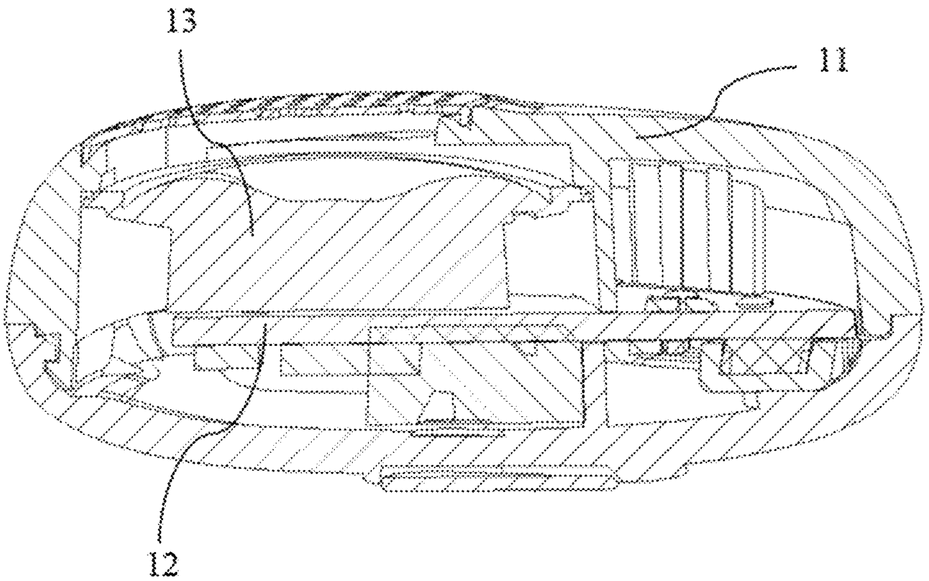
FIG. 3 is a schematic diagram of the cross-sectional structure of the output part of the open ear clip headphone according to an embodiment of the present disclosure.
Figure 5:
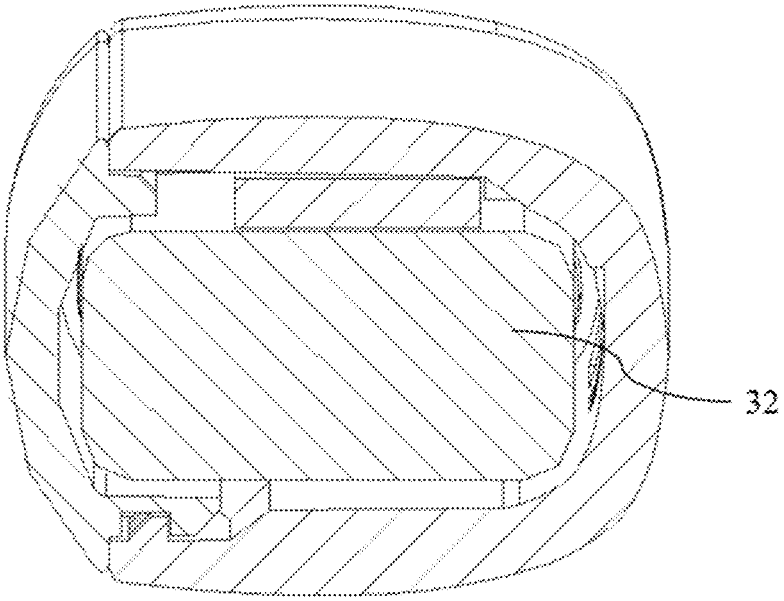
FIG. 5 is a schematic diagram of the cross-sectional structure of the battery part of the open ear clip headphone according to an embodiment of the present disclosure.

FIG. 1-3 is structural views of the open ear clip headphone according to an embodiment of the present disclosure. The open ear clip headphone can be worn on the ear and convert wireless audio signals from electronic devices such as mobile phones, computers, music players, etc. into sound for output. The open ear clip headphone according to this embodiment includes an output part 10, a wearing part 20, and a battery part 30, wherein the wearing part 20 is connected between the output part 10 and the battery part 30 and has an arc shape adapted to the human ear. A control circuit board 12 is contained in the output part 10. A battery 32 is contained in the battery part 30, as shown in FIG. 5. The control circuit board 12 of the output part 10 is electrically connected to the battery 32 in the battery part 30 through cables 23 passing through the wearing part 20, so that the battery 32 in the battery part 30 supplies power to the control circuit board 12.

Figure 4:
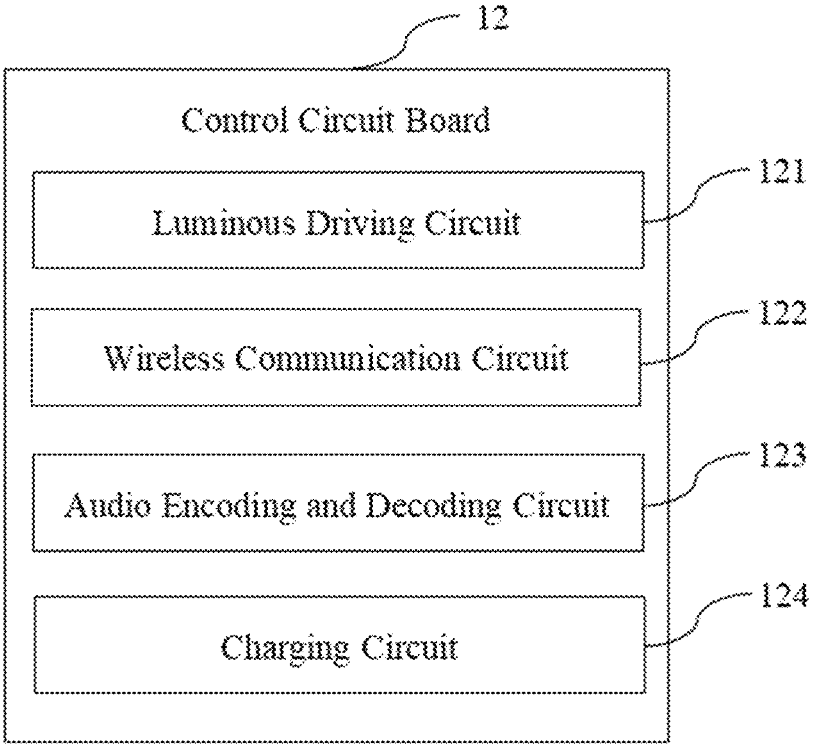
FIG. 4 is a block diagram of the control circuit board of the output part of the open ear clip headphone according to an embodiment of the present disclosure.

The output part 10 also includes a main housing 11 and a diaphragm sound emitting device 13 (i.e. a device that generates sound through a diaphragm, such as a speaker). The main housing has a directional sound hole 111. The diaphragm sound emitting device 13 and control circuit board 12 are respectively installed inside the main housing, and the diaphragm sound emitting device 13 is electrically connected to the control circuit board 12. As shown in FIG. 4, the control circuit board 12 is equipped with a wireless communication circuit 122 (such as a Bluetooth communication circuit, 2.4G communication circuits, etc.) and an audio encoding and decoding circuit 123. The wireless communication circuit 122 receives audio signals from electronic devices such as mobile phones, computers, and music players through the wireless communication circuit 122. The audio encoding and decoding circuit 123 analyze the received audio signals and send them to the diaphragm sound emitting device 13 to convert them into mechanical vibrations of the diaphragm thereby achieving sound output. In addition, the control circuit board 12 can also integrates charging interfaces and a charging circuit 124, microphones, etc. Specifically, the output part 10 and the battery part 30 can adopt any of the same solutions as existing headphones, which will not be further elaborated here.

The wearing part 20 includes not only the cables 23 for connecting the control circuit board 12 and the battery 32, but also an elastic sleeve 21 and a light strip 22. The clastic sleeve 21 is composed of silicone or plastic with elasticity, etc. The clastic sleeve 21 can bend within a certain angle range when subjected to external force and the clastic sleeve 21 forms an arc shape suitable for the human ear without external pressure. The clastic sleeve 21 is located between the output part 10 and the battery part 30, i.e. the two ends of the elastic sleeve 21 can be connected to the output part 10 and the battery part 30 respectively. The elastic sleeve 21 includes a first pipe hole 213, which is arranged along the axial direction of the elastic sleeve 21 (i.e., the first pipe hole 213 is arranged along the direction of the length of the elastic sleeve 21). The pipe wall of the first pipe hole 213 has an axially arranged transparent part, which is in the form of a strip and arranged along the direction of the length of the elastic sleeve 21. Specifically, the transparent part can be formed by transparent or semi transparent materials on the corresponding part of the pipe wall of the first pipe hole 213, or be formed by thinning the pipe wall of the corresponding part of the pipe wall.

Figure 6:
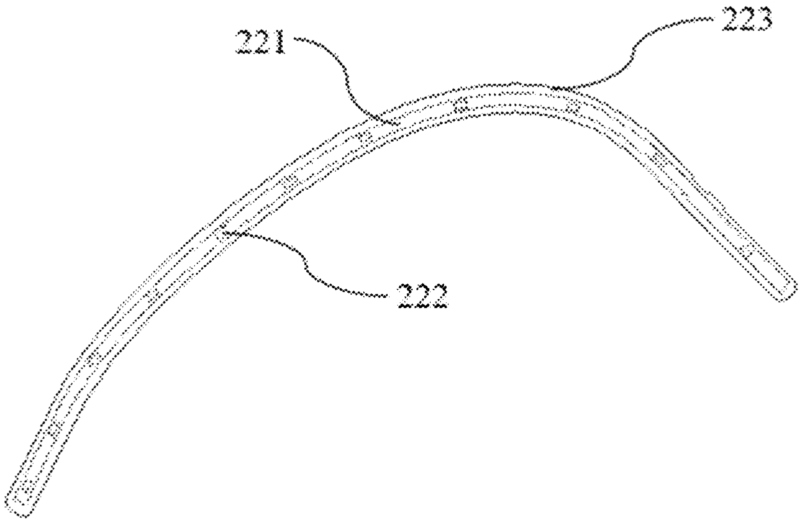
FIG. 6 is a schematic diagram of the light strip of the open ear clip headphone according to an embodiment of the present disclosure.

The light strip 22 includes a flexible circuit 221, a plurality of luminous bodies 222, and a wrapping body 223, as shown in FIG. 6. The luminous bodies 222 can be composed of cold light sources such as light-emitting diodes. The flexible circuit 221 is in the form of a strip. The plurality of luminous bodies 222 are respectively set on the same surface of the flexible circuit 221 and are arranged along the direction of the length of the flexible circuit 221. The plurality of luminous bodies 222 are all electrically connected to the flexible circuit 221. The wrapping body 223 wraps the flexible circuit 221 and the plurality of luminous bodies 222 bodies 222, and at least the part of the wrapping body 223 corresponding to the luminous bodies 222 are transparent or semi transparent. In practical applications, a part of the flexible circuit 221 may also be partially exposed from the package 223.

The light strip 22 is inserted into the first pipe hole 213 of the elastic sleeve 21 with the luminous bodies 222 emitting light the transparent part, for example, the luminous bodies 222 face to the transparent part. The control circuit board 12 inside the main housing 11 of the output part 10 has a luminous driving circuit 121 (such as an LED driving circuit), and the flexible circuit 221 is electrically connected to the luminous driving circuit 121 on the control circuit board 12, so that the luminous bodies 222 can emit light under the control of the luminous driving circuit 121. Any conventional technology of the luminous driving circuit 121 in this field can be used here, and it will not be repeated here.

It constructs a light strip by wrapping a flexible circuit integrated with the luminous body in the wrapping body and the light strip can be produced in advance, then inserts the light strip into an elastic sleeve with a transparent part to form the wearing part of the open ear luminous head wearable earphone. The luminous area of the open ear clip headphone is expanded compared with the current single point luminescence in the output part or battery part. For example, the luminous area can be extended to the entire wearing part 20. Moreover, due to the wrapping body 223 wrapping the luminous bodies 222 and the flexible circuit 221 together, the strength of the light strip 22 is greatly increased, making it easier to perform threading operations without causing the flexible circuit 221 to break or the luminous bodies 222 to detach from the flexible circuit 221 (including detachment or electrical disconnection) during the threading process, thereby improving the yield rate.

In one embodiment of the present disclosure, the battery 30 can also be placed inside the main housing 11 of the output part 10, that is, the open ear clip headphone no longer includes a battery part 30, and the wearing part 20 is connected to the output part 10. The open ear clip headphone can be worn through the wearing part 20. Correspondingly, there is no need to insert cables for connecting batteries into the wearing part 20.

In one embodiment of the present disclosure, the light strip 22 and the elastic sleeve 21 can also be injection molded together in such a way that the luminous bodies 222 emit light through the transparent part, such as the luminous bodies 222 face to the transparent part.

In order to make the luminous area more easily visible to the outside, in one embodiment of the present disclosure, the length of the transparent part of the elastic sleeve 21 in the direction of the length of the wearing part 20 exceeds half of the length of the wearing part 20. The transparent part is located on the elastic sleeve 21 that opposite to the orientation of the directional sound hole 111, that is, when the open ear clip headphone is worn to the ear, the transparent part is facing away from the human face, so that the luminous area can be more clearly observed from the outside.

In one embodiment of the present disclosure, the transparent part can also be located at the outer edge of the elastic sleeve 21, such as the upper edge of the wearing part 20 in FIG. 1. That is, when the open ear clip headphone is worn on the ear, the transparent part is exposed to the part in contact with the human body and can also be clearly observed from the outside. In addition, the transparent part can also be located on the same side as the directional sound hole 111 of the open ear clip headphone, that is, when the open ear clip headphone is worn on the ear, the transparent part is located on the side facing to the human face and can be seen by shining on the human skin, improving the overall luminescence, that is, the luminous body 222 on the light bar 22 will not be observed in a dot shape.

In one embodiment of the present disclosure, the elastic sleeve 21 is composed of a first pipe wall 211 and a second pipe wall 212 respectively arranged along the axial direction of the clastic. The first pipe hole 213 is surrounded by the first pipe wall 211 and the second pipe wall 212. For example, the cross-sections of the first pipe wall 211 and the second pipe wall 212 are both semi-circular. The transparency of the first tube wall 211 is greater than that of the second tube wall 212. The transparent part is composed of the first tube wall 211, that is, the elastic sleeve 21 is injection molded from the first pipe wall 211 and the second pipe wall 212, and the transparent part runs through the entire elastic sleeve 21 in the axial direction, thus maximizing the luminous area.

In practical implementation, the thickness of the first pipe wall 211 can be adjusted to a level that allows for light transmission based on the material of the elastic sleeve 21, thereby achieving light transmission for the first pipe wall 211 and no light transmission or poor light transmission for the second pipe wall 212. Alternatively, different materials can be used to form the first pipe wall 211 and the second pipe wall 212, such as adding opaque pigments to the material forming the second pipe wall 212, so that the first pipe wall 211 is transparent and the second tube wall 212 is opaque. By setting a second pipe wall that is opaque or has relatively poor transparency on the elastic sleeve 21, it is easy to hide the outline of the cables 23 or the light strip 21 inside the clastic sleeve 21, avoiding a cluttered appearance.

In order to stably fix the light strip 22 in the first pipe hole 213, in one embodiment of the present disclosure, the wrapping body 223 is composed of elastic material (such as silicone, etc.), and the light strip 22 is tightly matched with the pipe wall of the first pipe hole 213 through the wrapping body 223. That is, an external force needs to be applied when the light strip 22 penetrates the first pipe hole 213, so that it will not rotate after the light strip 22 penetrates the first pipe hole 213, and the luminous bodies 222 always faces the transparent part of the elastic sleeve 21.

In order to facilitate the insertion of the light strip 22 into the first pipe hole 213, the outer diameter of the wrapping body 223 is the same at different positions in the length direction, that is, the thickness of the light strip 22 inside the first pipe hole 213 is uniform.

Figure 7:
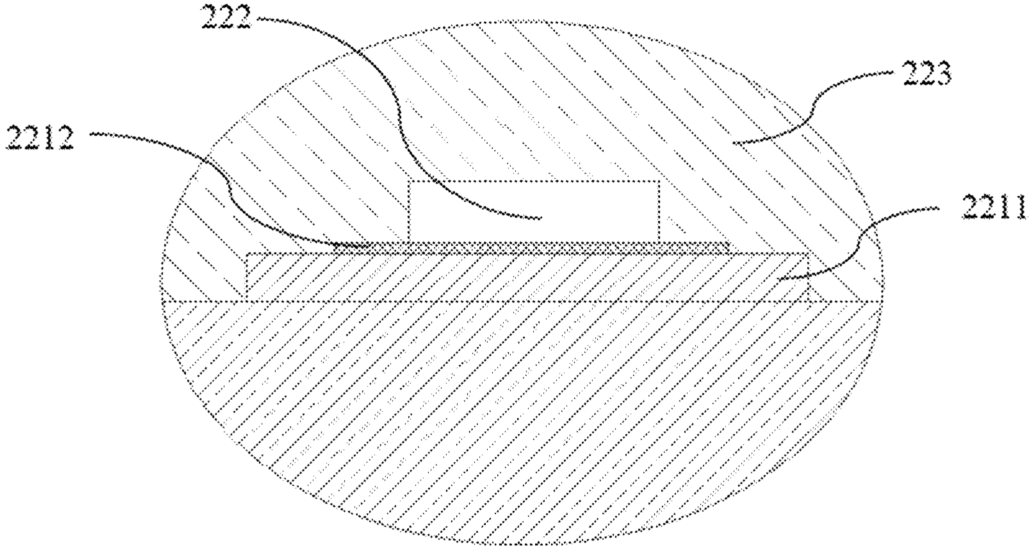
FIG. 7 is a schematic diagram of the cross-sectional structure of the light strip of the open ear clip headphone according to an embodiment of the present disclosure.

In one embodiment of the present disclosure, as shown in FIG. 7 the flexible circuit 221 comprises a flexible substrate 2211 and a printed circuit 2212 arranged on the flexible substrate 2211. The luminous bodies 222 are fixed on the flexible substrate 2211 and electrically connected to the printed circuit 2212. The flexible substrate 2211 can be electrically connected to the control circuit board 12 inside the housing 11 of the output part 10 through cables or wiring terminals (such as electrically connected to the light luminous driving circuit 121 on the control circuit board 12), thereby enabling the control circuit board 12 to control the light emission of the luminous bodies 222. The part of the wrapping body 223 located on the side of the luminous bodies 222 is made of transparent or semi transparent material. Moreover, the flexible substrate 2211 can also have a reflective layer to increase the amount of light output. At the same time, in order to reduce costs, the part of the package 223 facing away from the luminous bodies 222 is made of opaque material.

Of course, in some embodiments of the present disclosure, the flexible circuit 221 can also be composed of wires, but its strength is relatively low. When the process of threading the light strip 22 into the first pipe hole 213, the luminous bodies 222 is prone to detachment or breakage.

In one embodiment of the present disclosure, the cables 23 for connecting the control circuit board 12 and the battery 32 is threaded together with the light strip 22 into the first pipe hole 213. The cables 23 is located on the opposite side of the transparent part on the first pipe hole 213, so as not to affect the light output of the light strip 22. In this way, the light strip 22 and the cables 23 can be inserted into the first pipe hole 213 together to improve processing efficiency.

In order to improve the clamping force of the wearing part 20 during wearing, in one embodiment of the present disclosure, the wearing part 20 includes an elastic metal wire 24, which is threaded together with the light strip 22 in the first pipe hole 213. The elastic metal wire 24 is located on the opposite side of transparent part on the first pipe hole 213, so as not to affect the light output of the light strip 22. In this way, the light strip 22 and the elastic metal wire 24 can be inserted into the first pipe hole 213 together to improve processing efficiency. Of course, the light strip 22, the cables 23, and the elastic metal wire 24 can be inserted through the first pipe hole 213 together. In some embodiments of the present disclosure, the wearing part 20 may not be equipped with elastic metal wires 24, but instead by the elasticity of the elastic sleeve 21 itself to provide clamping force for the open ear clip headphones.

Figure 8:
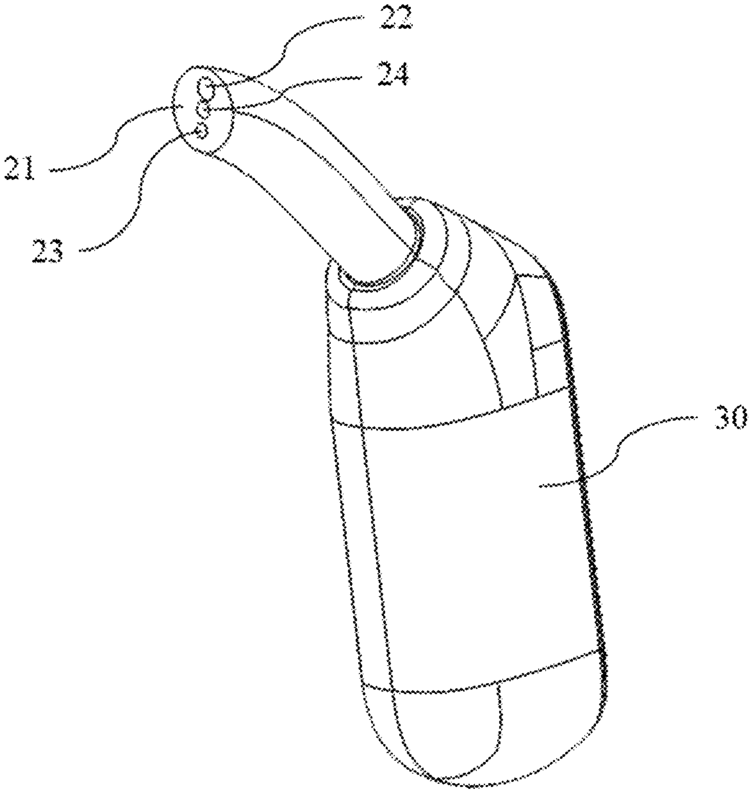
FIG. 8 is a schematic diagram of a partial cross-sectional structure of the open ear clip headphone according to another embodiment of the present disclosure.

As shown in FIG. 8, in one embodiment of the present disclosure, the elastic sleeve 21 may further include a second pipe hole and a third pipe hole in the axial direction (i.e., the length direction), and both the second pipe hole and the third pipe hole are away from the transparent part. The cables 23 is threaded into the second pipe hole, and the elastic metal wire 24 is threaded into the third pipe hole. Of course, due to the fact that the light bar 22, the cables 23, and the elastic metal wire 24 need to be respectively threaded through three pipe holes, the process is relatively complex.

Figure 9:
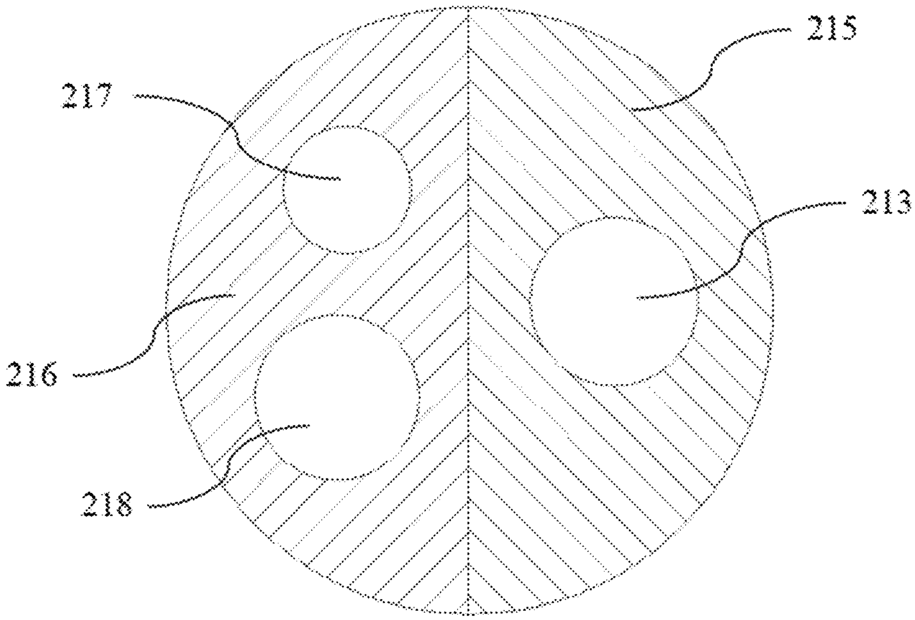
FIG. 9 is a schematic diagram of the cross-sectional structure of the wearing part of the open ear clip headphone according to another embodiment of the present disclosure.

As shown in FIG. 9, in one embodiment of the present disclosure, the elastic sleeve 21 includes a first part 215 and a second part 216 arranged along the length of the elastic sleeve 21. The transparency of the first part 215 is greater than that of the second part 216. The first pipe hole 213 is located in the first part 215, and the second pipe hole 217 and the third pipe hole 218 are both located in the second part 216. Thus, the positions of the light strip 22, the cables 23, and the clastic metal wire 24 inside the elastic sleeve 21 can be relatively fixed, avoiding relative movement when use. The cross-sections of the first part 215 and the second part 216 mentioned above can be semi-circular. In some embodiments of the present disclosure, the radial dimensions or central angle of the first part 215 and the second part 216 can also be adjusted according to the radial dimensions of the light strip 22, the cables 23, and the elastic metal wire 24. For example, the radial dimension of the first part 215 can be made larger than that of the second part 216.

In addition, only two pipe holes can be provided in the elastic sleeve 21, and the light strip 22 and the cables 23 can be threaded through one of the pipe hole, while the elastic metal wire 24 can be threaded through the other pipe hole (or the elastic metal wire 24 and the elastic sleeve 21 can be injection molded together). Alternatively, the light strip 22 and the elastic metal wire 24 can be threaded through one of the pipe hole, and the cables 23 can be threaded through the other pipe hole. Alternatively, the clastic metal wire 24 and the cables 23 can be threaded through one of the pipe hole, while the light strip 22 can be threaded separately through another pipe hole. For the embodiment without battery part 30, the light strip 22 and the elastic metal wire 24 can be respectively threaded through two pipe holes. For the embodiment without elastic metal wire 24, the light bar 22 and the cables 23 can be respectively threaded through two pipe holes.

The open ear clip headphone can be an ear hanging headphone as shown in FIG. 1. The wearing part 20 of the headphone is in a hook shape that matches the shape of the base of the auricle. The output part 10 and the battery part 30 can adopt the conventional structure of existing ear hanging earphones. When the headphone is worn, the output part 10 is located on the front side of the auricle, the wearing part 20 is wrapped from the front side of the auricle to the back side of the auricle through the top of the auricle, and the battery part 30 is located on the back side of the auricle.

Figure 10:
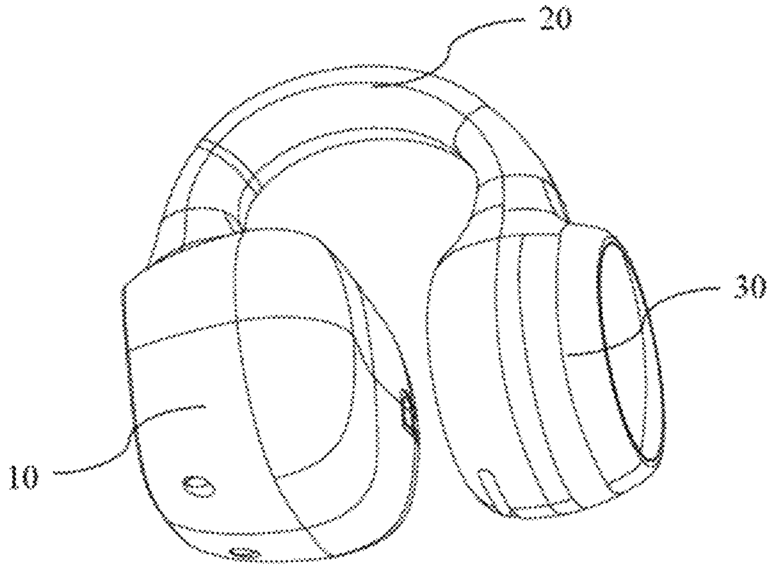
FIG. 10 is a schematic diagram of the open ear clip headphone according to another embodiment of the present disclosure.

The open ear clip headphone can be a clip on headphone as shown in FIG. 10. Correspondingly, the wearing part 20 of the headphone is arc-shaped, and the output part 10 and battery part 30 can adopt the conventional structure of existing clip on headphones. When the headphone is worn, the output part 10 is inserted into the ear nail cavity, and the wearing part 20 is wrapped from the front side of the auricle to the back side of the auricle through the side of the auricle, while the battery part 30 is located at the back of the auricle in the wearing state.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. An open ear clip headphone comprising: an output part and a wearing part, wherein:

the output part comprises a control circuit board, and the control circuit board has a luminous driving circuit, the wearing part is in the shape of an arc adapted to the human ear and the wearing part comprises:

an elastic sleeve connected to the output part, wherein the elastic sleeve comprises a first pipe hole along the axial direction of the elastic sleeve, and the wall of the first pipe hole has an axially arranged transparent part;

a light strip comprising a flexible circuit in the form of a strip, a plurality of luminous bodies respectively arranged on the same surface of the flexible circuit, and a wrapping body that wraps or partially wraps the flexible circuit and luminous bodies, wherein the plurality of luminous bodies are arranged along the direction of the length of the flexible circuit, and the part corresponding to the luminous bodies on the wrapping body is transparent or semi transparent; the light strip is inserted into the first pipe hole of the elastic sleeve with the luminous bodies emitting light through the transparent part; the flexible circuit is electrically connected to the luminous driving circuit.

2. The open ear clip headphone according to claim 1, wherein:

the output part comprises a main housing and a device emitting sound through a diaphragm, the device emitting sound through a diaphragm electrically connects to the control circuit board, the device emitting sound through a diaphragm and the control circuit board are respectively set inside the main housing, and the main housing has directional sound pipe holes;

the length of the transparent part on the elastic sleeve exceeds half of the length of the wearing part in the direction of the length of the wearing part, the transparent part is located on the opposite direction side as the directional sound pipe holes, or the transparent part is located on the same side as the directional sound pipe holes, or the transparent part is located on the outer edge of the elastic sleeve.

3. The open ear clip headphone according to claim 1, wherein:

the elastic sleeve is composed of a first pipe wall and a second pipe wall respectively arranged along the axial direction of the elastic sleeve, the first pipe hole is surrounded by the first pipe wall and the second pipe wall, the transparency of the first pipe wall is greater than that of the second pipe wall, and the transparent part is composed by the first pipe wall.

4. The open ear clip headphone according to claim 3, wherein:

the wearing part comprises an elastic metal wire, and the elastic metal wire is inserted into the first pipe hole of the elastic sleeve against the transparent part.

5. The open ear clip headphone according to claim 1, wherein:

the open ear clip headphone comprises a battery part, and the wearing part is connected between the output part and the battery part, the control circuit board inside the output part is electrically connected to the battery in the battery part through cables passing through the wearing part, and the elastic sleeve is located between the output part and the battery part.

6. The open ear clip headphone according to claim 5, wherein:

the wearing part is in a hook shape that matches the shape of the base of the auricle, when the open ear clip headphone wearing on the ear, the output part is located on the front side of the auricle, the wearing part wraps from the front side of the auricle through the top of the auricle to the back side of the auricle, and the battery part is located on the back side of the auricle.

7. The open ear clip headphone according to claim 5, wherein:

the wearing part is arc-shaped, when the open ear clip headphone wearing on the ear, the output part is inserted into the ear nail cavity, the wearing part is wrapped from the front side of the auricle to the back side of the auricle through the side of the auricle, and the battery part is located on the back side of the auricle.

8. The open ear clip headphone according to claim 5, wherein:

the elastic sleeve comprises a first part and a second part arranged along the direction of the length of the elastic sleeve, the transparency of the first part is greater than that of the second part, the first pipe hole is located in the first part, the second part has a second pipe hole along the direction of the length of the elastic sleeve, and the cables are threaded through the second pipe hole.

9. The open ear clip headphone according to claim 8, wherein:

the wearing part comprises an elastic metal wire, the second part has a third pipe hole arranged along the direction of the length of the elastic sleeve, and the elastic metal wire is threaded through the third pipe hole.

10. The open ear clip headphone according to claim 5, wherein:

the wearing part comprises an elastic metal wire, the light strip, the elastic metal wire and the cables are threaded through the first pipe hole together.

11. The open ear clip headphone according to claim 1, wherein:

the wrapping body of the light strip is composed of elastic material, the light strip is tightly fitted with the pipe wall of the first pipe hole through the wrapping body, the outer diameter of the wrapping body at different positions in the length direction is same;

the flexible circuit comprises a flexible substrate and a printed circuit set on the flexible substrate, and the plurality of luminescent bodies are electrically connected to the printed circuit, the part of the wrapping body located on one side of the luminous bodies is composed of transparent or semi transparent material.

12. The open ear clip headphone according to claim 1, wherein:

the elastic sleeve comprises a first part and a second part arranged along the direction of the length of the elastic sleeve, and the transparency of the first part is greater than that of the second part, the first pipe hole is located in the first part;

the wearing part comprises an elastic metal wire, and the second part comprises a third pipe hole arranged along the direction of the length of the elastic sleeve, and the elastic metal wire is threaded through the third pipe hole.

13. The open ear clip headphone according to claim 1, wherein:

the wearing part is in a hook shape that matches the shape of the base of the auricle, when the open ear clip headphone wearing on the ear, the output part is located on the front side of the auricle, and the wearing part wraps from the front side of the auricle through the top of the auricle to the back side of the auricle.

14. The open ear clip headphone according to claim 1, wherein:

the wearing part is arc-shaped, when the open ear clip headphone wearing on the ear, the output part is inserted into the ear nail cavity, and the wearing part is wrapped from the front side of the auricle to the back side of the auricle through the side of the auricle.

15. An open ear clip headphone comprising: an output part and a wearing part, wherein:

the output part comprises a control circuit board, and the control circuit board has a luminous driving circuit, the wearing part is in the shape of an arc adapted to the human ear and the wearing part comprises:

an elastic sleeve connected to the output part, wherein the elastic sleeve comprises a first pipe hole along the axial direction of the elastic sleeve, and the wall of the first pipe hole has an axially arranged transparent part;

a light strip comprising a flexible circuit in the form of a strip, a plurality of luminous bodies respectively arranged on the same surface of the flexible circuit, and a wrapping body that wraps or partially wraps the flexible circuit and luminous bodies, wherein the plurality of luminous bodies are arranged along the direction of the length of the flexible circuit, and the part corresponding to the luminous bodies on the wrapping body is transparent or semi transparent; the light strip is injection molded with the elastic sleeve with the luminous bodies emitting light through the transparent part; the flexible circuit is electrically connected to the luminous driving circuit.

* * * * *